(12) United States Patent
Xie

(10) Patent No.: US 10,203,529 B2
(45) Date of Patent: Feb. 12, 2019

(54) DISPLAY PANEL AND DISPLAY DEVICE

(71) Applicants: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD., Wuhan, Hubei (CN)

(72) Inventor: Chang Xie, Guangdong (CN)

(73) Assignees: SHENZHEN CHINA STAR OPTOELECTRONICS TECHNOLOGY CO., LTD., Shenzhen (CN); WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 567 days.

(21) Appl. No.: 14/655,174

(22) PCT Filed: Apr. 2, 2015

(86) PCT No.: PCT/CN2015/075814
§ 371 (c)(1),
(2) Date: Jun. 24, 2015

(87) PCT Pub. No.: WO2016/145684
PCT Pub. Date: Sep. 22, 2016

(65) Prior Publication Data
US 2016/0313586 A1 Oct. 27, 2016

(30) Foreign Application Priority Data
Mar. 18, 2015 (CN) .......................... 2015 1 0118950

(51) Int. Cl.
G02F 1/1343 (2006.01)
G02F 1/133 (2006.01)
(Continued)

(52) U.S. Cl.
CPC ........ *G02F 1/13306* (2013.01); *G02F 1/1368* (2013.01); *G02F 1/133305* (2013.01);
(Continued)

(58) Field of Classification Search
CPC .......................................... G02F 2001/134381
See application file for complete search history.

(56) References Cited

U.S. PATENT DOCUMENTS

2005/0128412 A1 6/2005 Lee
2007/0139598 A1 6/2007 Choi et al.
(Continued)

FOREIGN PATENT DOCUMENTS

CN    1983000 A    6/2007
CN    101196657 A  6/2008
(Continued)

*Primary Examiner* — Alexander Gross
(74) *Attorney, Agent, or Firm* — Ladas & Parry LLP

(57) ABSTRACT

A display panel and a display device are provided. A color filter substrate of the display panel includes a color filter layer and a first common electrode; the first common electrode is located in a first sub-area of the color filter layer; a thin film transistor array substrate of the display panel includes a second substrate, a second common electrode, and a pixel electrode; the second common electrode and the pixel electrode are respectively located in a third sub-area and a fifth sub-area of the second substrate. The driving voltage of the display panel can be reduced.

15 Claims, 7 Drawing Sheets

(51) Int. Cl.
*G02F 1/1333* (2006.01)
*G02F 1/1335* (2006.01)
*G02F 1/1368* (2006.01)

(52) U.S. Cl.
CPC .. *G02F 1/133514* (2013.01); *G02F 1/134309* (2013.01); *G02F 1/134363* (2013.01); *G02F 2001/134318* (2013.01); *G02F 2001/134381* (2013.01); *G02F 2201/121* (2013.01); *G02F 2201/123* (2013.01); *G02F 2202/022* (2013.01)

(56) References Cited

U.S. PATENT DOCUMENTS

| | | | |
|---|---|---|---|
| 2010/0195028 A1 | 8/2010 | Kubota et al. | |
| 2013/0128207 A1 | 5/2013 | Nakano et al. | |
| 2015/0002798 A1* | 1/2015 | Miyakawa | G02F 1/133707 349/123 |
| 2016/0313616 A1* | 10/2016 | Arai | G02F 1/134309 |

FOREIGN PATENT DOCUMENTS

| | | |
|---|---|---|
| CN | 101794047 A | 8/2010 |
| CN | 104155816 A | 11/2014 |

\* cited by examiner

DISPLAY PANEL AND DISPLAY DEVICE

FIELD OF THE INVENTION

The present invention relates to a field of display technology, and in particular to a display panel and a display device.

BACKGROUND OF THE INVENTION

Generally, the color filter substrate of a conventional display panel comprises a common electrode layer, and an over coater (OC layer) disposed on the surface of the common electrode layer.

The OC layer functions to generate a more even transverse electric field inside a liquid crystal cell composed of the color filter substrate and a thin film transistor array substrate of the display panel.

However, the initial orientation of the conventional liquid crystal molecules is vertical-align; under the effect of the transverse electric field, the liquid crystal molecules will create a phase retardation phenomenon.

In the above technical solution, the driving voltage for the display panel is higher and the light efficiency is lower.

Therefore, it is necessary to provide a new technical solution to solve the above technical problems.

SUMMARY OF THE INVENTION

The objective of the present invention is to provide a display panel and a display device that can reduce the driving voltage of the display panel, and improve the display quality of the display panel.

To solve the above problems, the technical solution of the present invention is as follows:

A display panel, the display panel comprises:

A color filter substrate, the color filter includes: a first substrate; a color filter layer, the color filter layer having at least two first unit areas arranged in a form of an array, the first unit area comprising a first sub-area and a second sub-area; a first common electrode layer, the first common electrode layer including at least two first common electrodes, the first common electrode being located in the first sub-area; and a dielectric layer.

A liquid crystal layer, the liquid crystal layer is a blue-phase liquid crystal layer or a positive-type liquid crystal layer, wherein the blue-phase liquid crystal layer comprises blue-phase liquid crystal molecules, the positive-type liquid crystal layer comprises positive-type liquid crystal molecules.

And a thin film transistor array substrate, the thin film transistor array substrate comprises: a second substrate, the second substrate having at least two second unit areas, the at least two second unit areas being arranged in a form of an array, a position where the second unit area is located corresponds to a position where the first unit area is located, the second unit area includes a third sub-area, a fourth sub-area and a fifth sub-area, the fourth sub-area is located between the third sub-area and the fifth sub-area; a second common electrode layer, the second common electrode having at least two common electrodes, the second common electrode being located in the third sub-area; and a pixel electrode layer, the pixel electrode layer having at least two pixel electrodes, the pixel electrode being located in the fifth sub-area, wherein the pixel electrode layer and the second common electrode layer are disposed on the same layer.

The color filter substrate and the thin film array substrate are stacked together in integral assembly, the liquid crystal layer is disposed between the color filter substrate and the thin film transistor array substrate, the first common electrode layer is disposed between the dielectric layer and the color filter layer, and at least one part of the dielectric layer fills the second sub-area of the first common electrode layer. The color filter substrate and the thin film array substrate are stacked together in integral assembly, the liquid crystal layer is disposed between the color filter substrate and the thin film transistor array substrate.

In the display panel mentioned above, a position where the third sub-area is located corresponds to a position where the first sub-area is located, a position where the fifth sub-area is located corresponds to a position where the second sub-area is located, and an area of the fifth sub-area is less than or equal to an area of the second sub-area.

In the display panel mentioned above, the first sub-area surrounds the second sub-area; the third sub-area surrounds the fourth sub-area, and the fourth sub-area surrounds the fifth sub-area.

In the display panel mentioned above, the first sub-area is a polygonal ring-shaped, circular ring-shaped, or oval ring-shaped, the second sub-area is a polygonal shaped, circular shaped, or oval shaped; the third sub-area and the fourth sub-area are polygonal ring-shaped, circular ring-shaped, or oval ring-shaped, the fifth sub-area is a polygonal shaped, circular shaped, or oval shaped.

A display panel, wherein the display panel comprises:

A color filter substrate comprises: a first substrate; a color filter layer, the color filter having at least two first unit areas, the at least two first unit areas being arranged in a form of an array, the first unit area comprising a first sub-area and a second sub-area; a first common electrode layer, the first common electrode being having at least two first common electrodes located in the first sub-area; and a dielectric layer.

A liquid crystal layer, the liquid crystal layer is a blue-phase liquid crystal layer or a positive-type liquid crystal layer, wherein the blue-phase liquid crystal layer comprises blue-phase liquid crystal molecules, the positive-type liquid crystal layer comprises positive-type liquid crystal molecules.

And a thin film transistor array substrate, the thin film transistor array substrate comprises: a second substrate, the second substrate having at least two second unit areas, the at least two second unit areas being arranged in a form of an array, a position where the second unit area is located corresponds to a position where the first unit area is located, the second unit area including a third sub-area, a fourth sub-area and a fifth sub-area, the fourth sub-area being located between the third sub-area and the fifth sub-area; a second common electrode layer, the second common electrode layer having at least two second common electrodes, the second common electrode being located in the third sub-area; and a pixel electrode layer, the pixel electrode layer having at least two pixel electrodes located in the fifth sub-area, wherein the pixel electrode layer and the second common electrode layer are disposed on the same layer. The color filter substrate and the thin film transistor array are stacked together in integral assembly, the liquid crystal layer is disposed between the color filter substrate and the thin film transistor array substrate.

In the display panel mentioned above, a position where the third sub-area is located corresponds to a position where the first sub-area is located, a position where the fifth sub-area is located corresponds to a position where the second sub-area is located, and an area of the fifth sub-area is less than or equal to an area of the second sub-area.

In the display panel mentioned above, the first sub-area covers the entire third sub-area and a part of the fourth sub-area, the second sub-area covers the entire fifth sub-area and another part of the fourth sub-area; or the first sub-area covers the entire third sub-area, the second sub-area covers the entire fourth sub-area and the entire fifth sub-area.

In the display panel mentioned above, the first sub-area surrounds the second sub-area, the third sub-area surrounds the fourth sub-area, and the fourth sub-area surrounds the fifth sub-area.

In the display panel mentioned above, the first sub-area is a polygonal ring-shaped, circular ring-shaped, or oval ring-shaped, the second sub-area is polygonal shaped, circular shaped, or oval shaped; the third sub-area and the fourth sub-area polygons are polygonal ring-shaped, circular ring-shaped, or oval ring-shaped, the fifth sub-area is a polygonal shaped, circular shaped, or oval shaped.

In the display panel mentioned above, the first common electrode layer is disposed between the dielectric layer and the color filter layer; and at least one part of the dielectric layer fills the second sub-area in the first common electrode.

In the display panel mentioned above, the first common electrode has a width in a range from 2 μm to 10 μm.

In the display panel mentioned above, the color filter substrate and the thin film transistor array substrate are respectively provided with a first polyimide layer and a second polyimide layer, the first polyimide layer and the second polyimide layer both are disposed in a vertical alignment state.

A display device, wherein the display device comprises: a backlight module and a display panel.

The display panel comprises:

A color filter substrate, the color filter substrate includes: a first substrate; a color filter layer, the color filter layer having at least two first unit areas, the at least two first unit areas being arranged in a form of an array, the first unit area comprising a first sub-area and a second sub-area; a first common electrode layer, the first common electrode layer having at least two first common electrodes located in the first sub-area; and a dielectric layer.

A liquid crystal layer, the liquid crystal layer is a blue-phase liquid crystal layer or a positive-type liquid crystal layer, wherein the blue-phase liquid crystal layer comprises blue-phase liquid crystal molecules, the positive-type liquid crystal layer comprises positive-type liquid crystal molecules.

And a thin film transistor array substrate, the thin film transistor array substrate comprising: a second substrate, the second substrate having at least two second unit areas, the at least two second unit areas being arranged in a form of an array, a position where the second unit area is located corresponds to a position where the first unit area is located, the second unit area including a third sub-area, a fourth sub-area and a fifth sub-area, the fourth sub-area being located between the third sub-area and the fifth sub-area; a second common electrode layer, the second common electrode having at least two second common electrodes, the second common electrode being located in the third sub-area; and a pixel electrode layer, the pixel electrode layer having at least two pixel electrodes, the pixel electrodes being located in the fifth sub-area, wherein the pixel electrode layer and the second common electrode layer are disposed on the same layer.

The color filter substrate and the thin film transistor array are stacked together in integral assembly, the liquid crystal layer is disposed between the color filter substrate and the thin film transistor array substrate.

In the display device mentioned above, a position where the third sub-area is located corresponds to a position where the first sub-area is located, a position where the fifth sub-area is located corresponds to a position where the second sub-area is located, and an area of the fifth sub-area is less than or equal to an area of the second sub-area.

In the display device mentioned above, the first sub-area covers the entire third sub-area and a part of the fourth sub-area, the second sub-area covers the entire fifth sub-area and another part of the fourth sub-area; or the first sub-area covers the entire third sub-area, the second sub-area covers the entire fourth sub-area and the entire fifth sub-area.

In the display device mentioned above, the first sub-area surrounds the second sub-area, the third sub-area surrounds the fourth sub-area, and the fourth sub-area surrounds the fifth sub-area.

In the display device mentioned above, the first sub-area is a polygonal ring-shaped, circular ring-shaped, or oval ring-shaped, the second sub-area is a polygonal shaped, circular shaped, or oval shaped; the third sub-area and the fourth sub-area polygons are polygonal ring-shaped, circular ring-shaped, or oval ring-shaped, the fifth sub-area is a polygonal shaped, circular shaped, or oval shaped.

In the display device mentioned above, the first common electrode layer is disposed between the dielectric layer and the color filter layer; and at least one part of the dielectric layer fills the second sub-area in the first common electrode.

In the display device mentioned above, first common electrode has a width in a range from 2 μm to 10 μm.

In the display device mentioned above, the color filter substrate and the thin film transistor array substrate are respectively provided with a first polyimide layer and a second polyimide layer, the first polyimide layer and the second polyimide layer both are disposed in a vertical alignment state.

Compared with the conventional art, the present invention can reduce the driving voltage of the display panel, and enhance its display quality.

For a better understanding of the aforementioned content of the present invention, preferable embodiments are illustrated in accordance with the attached figures for further explanation.

DETAILED DESCRIPTION OF THE PREFERRED EMBODIMENTS

The word embodiment is used herein to mean serving as an example, instance, or illustration. Additionally, as used in this specification and the appended claims, the singular forms "a", "an", and "the" encompass embodiments having plural referents, unless the content clearly dictates otherwise.

Figure 1:
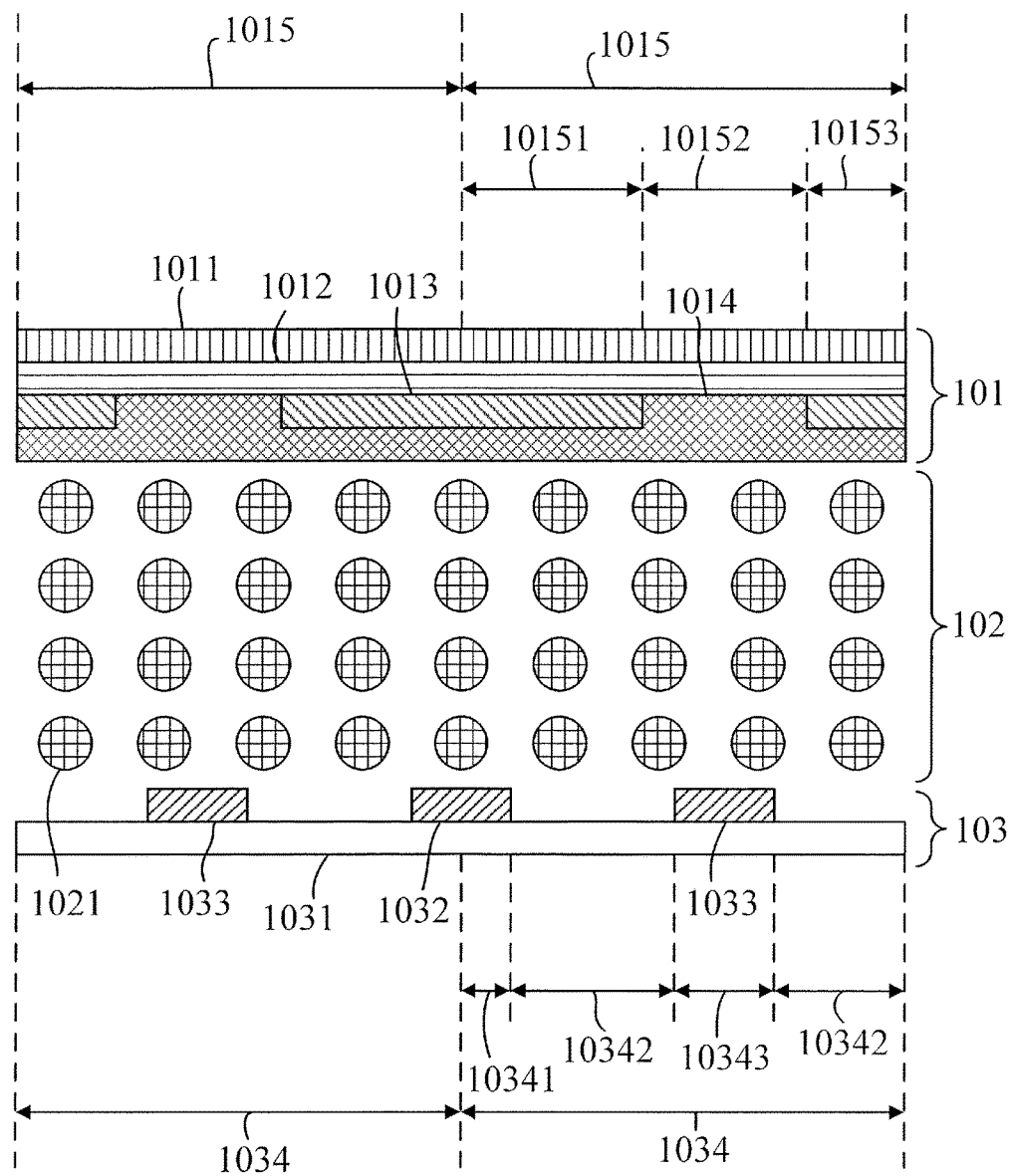
FIG. 1 is a schematic diagram of a display panel according to a first embodiment of the present invention.

Please refer to FIG. 1, which is a schematic diagram of a display panel according to a first embodiment of the present invention. The display device of the present invention comprises a backlight module and a display panel, the backlight module and the display panel are stacked together in integral assembly.

The display panel includes a color filter substrate 101, a liquid crystal layer 102, and a thin film transistor array substrate 103. The liquid crystal layer 102 is a blue-phase liquid crystal layer, and the blue-phase liquid crystal layer comprises blue-phase liquid crystal molecules 1021. The color filter substrate 101 and the thin film transistor array substrate 103 are stacked together in integral assembly, and the liquid crystal layer 102 is disposed between the color filter substrate 101 and the thin film transistor array substrate 103.

The color filter substrate 101 comprise: a first substrate 1011, a color filter layer 1012, a first common electrode layer 1013, and a dielectric layer 1014. The color filter layer 1012 includes at least two first unit areas 1015, the at least two first unit areas 1015 are arranged in a form of an array (one-dimension array or two-dimension array), the first unit area 1015 comprises a first sub-area 10151 and a second sub-area 10152.

The first common electrode layer 1013 is disposed between the dielectric layer 1014 and the color filter layer 1012. The first common electrode layer 1013 includes at least two first common electrodes 10131, the first common electrodes 10131 is located in the first sub-area 10151. At least one part of the dielectric layer 1014 fills the second sub-area 10152 in the first common electrode layer 1013. That is, the first common electrode layer 1013 is provided with concave/hole, and the recess portion of the concave/hole is corresponds to the second sub-area 10152.

The width of the first common electrode 10131 is in the range of 2 μm to 10 μm, for example, the width of the first common electrode 10131 can be selected from: 2 μm, 2.3 μm, 2.8 μm, 3.1 μm, 3.6 μm, 3.9 μm, 4.3 μm, 4.7 μm, 5.3 μm, 5.9 μm, 6.2 μm, 6.5 μm, 6.9 μm, 7.4 μm, 7.7 μm, 7.9 μm, 8.5 μm, 8.8 μm, 9.0 μm, 9.3 μm, 9.6 μm, 9.9 μm, and 10.0 μm.

The thin film transistor array substrate 103 includes a second substrate 1031, a second common electrode layer, and a pixel electrode layer. The second substrate 1031 includes at least two second unit areas 1034, the at least two second unit areas 1034 are arranged in a form of an array (one-dimensional array or two-dimensional array), a position where the second unit area 1034 is located corresponds to a position where the first unit area 1015 is located, the second unit area 1034 includes a third sub-area 10341, a fourth sub-area 10342, and a fifth sub-area 10343, the fourth sub-area 10342 is located between the third sub-area 10341 and the fifth sub-area 10343.

The second common electrode layer includes at least two second common electrodes 1032, the at least two second common electrodes 1032 are located in the third sub-area 10341. The pixel electrode layer includes at least two pixel electrodes 1033, the pixel electrodes 1033 are located in the fifth sub-area 10343, wherein the pixel electrode layer and the second common electrode layer are disposed on the same layer.

In the above technical solution, since the blue-phase liquid crystal molecules 1021 are provided in the liquid crystal cell which is composed of the color filter substrate 101 and the thin film transistor array substrate 103, the blue-phase liquid crystal molecules 1021 in the liquid crystal cell perform an isotropic state when the voltage is not applied. When the incident light pass through the isotropic state of the blue-phase liquid crystal molecules 1021, a phase retardation will not be produced, therefore polyimide (PI) layer can be omitted, and the production process can be simplified. Meanwhile, since the polarization direction of the emergent light does not change, so the above technical solution can further prevent the display panel from a dark-state light leakage phenomenon, and improve the contrast of the display panel.

Figure 4:
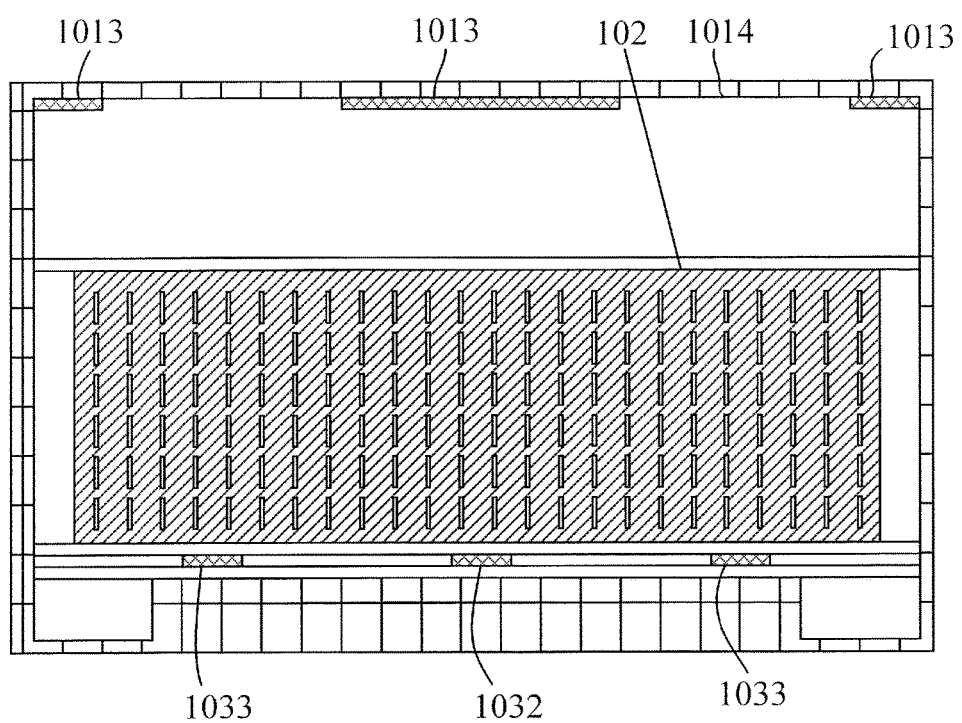
FIG. 4 is a mimic diagram of a display panel without applying a voltage.
Figure 5:
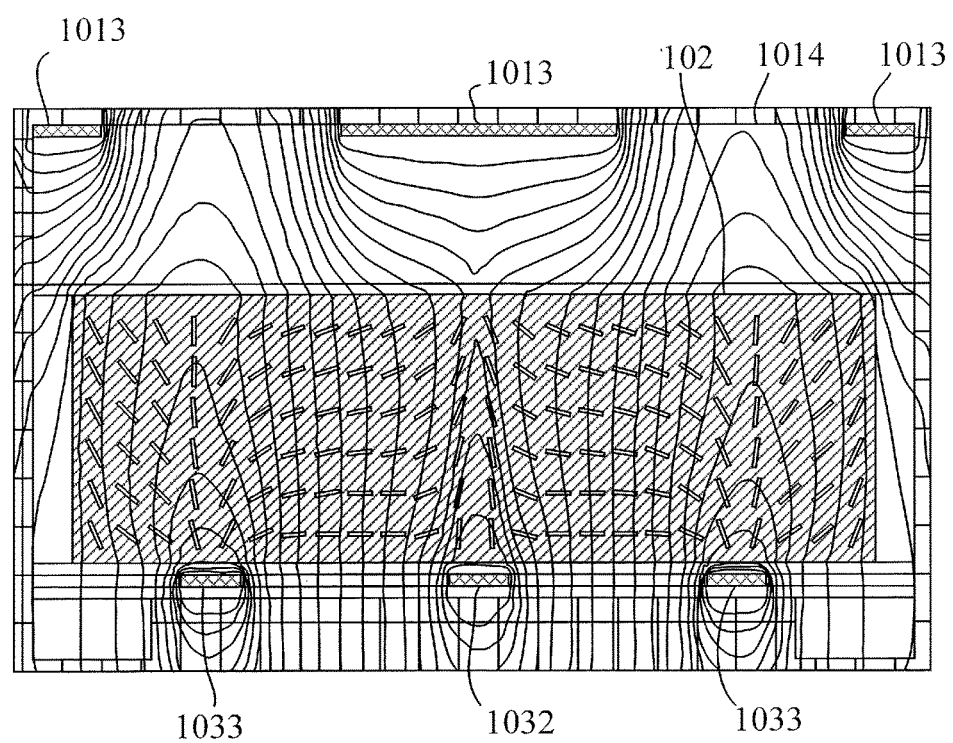
FIG. 5 is a mimic diagram of a display panel when applying a voltage.

Besides, since a portion of the first common electrode layer 1013 facing the pixel electrode 1033 is removed, and only the portion of the first common electrode layer 1013 which does not face to the pixel electrode 1033 is reserved, the intensity of the vertical electric field formed by facing the pixel electrode 1033 to the first common electrode 10131 is therefore reduced, and intensity of the horizontal electric field in the liquid crystal cell is enhanced, as shown in FIGS. 4 and 5. Furthermore, the above technical solution also reduces the driving voltage of the display panel, and improves the display quality (light efficiency) of the display panel.

In the embodiment, a position where the third sub-area 10341 is located corresponds to a position where the first sub-area 10151 is located, a position where the fifth sub-area 10343 is located corresponds to a position where the second sub-area 10152 is located, and an area of the fifth sub-area 10343 is less than or equal to an area of the second sub-area 10152.

The first sub-area 10151 crosses the third sub-area 10341 and the fourth sub-area 10342, which means that the first sub-area 10151 covers entire third sub-area 10341 and a part of the fourth sub-area 10342; the second sub-area 10152 crosses the fourth sub-area 10342 and the fifth sub-area 10343, which means that the second sub-area 10152 covers entire fifth sub-area 10343 and another part of the fourth sub-area 10342.

In the present embodiment, the first sub-area 10151 surrounds the second sub-area 10152, the third sub-area 10341 surrounds the fourth sub-area 10342, and the fourth sub-area 10342 surrounds the fifth sub-region 10343.

Figure 2:
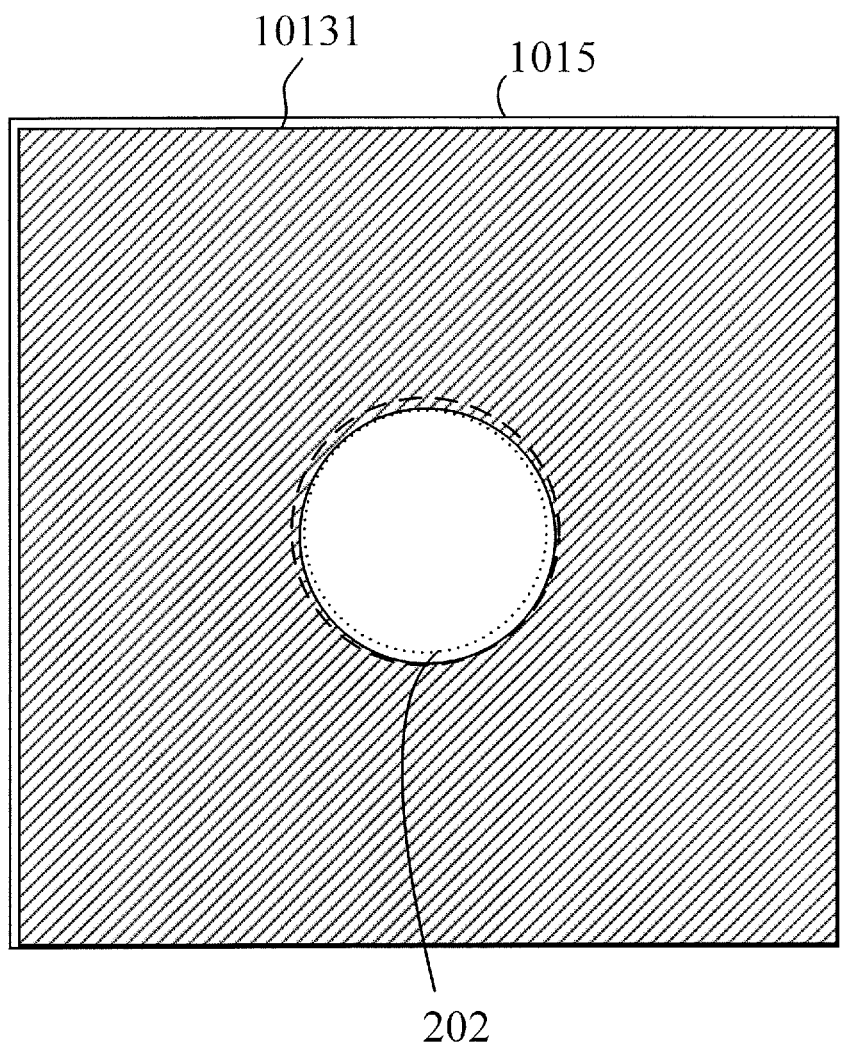
FIG. 2 is a top view of a first common electrode layer of a first unit area.
Figure 3:
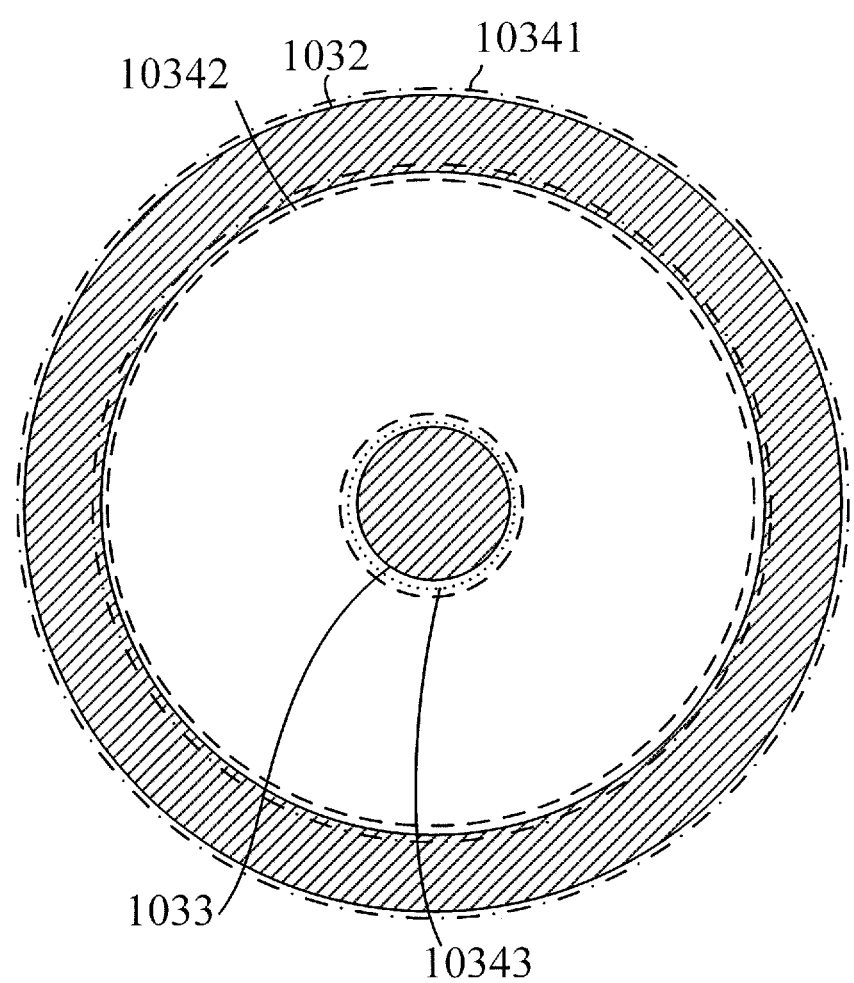
FIG. 3 is a top view of a second common electrode layer of a second unit area.

Referring to FIGS. 2 and 3, FIG. 2 is a top view of the first common electrode layer 1013 of a first unit area 1015 in FIG. 1, and FIG. 3 is a top view of the second common electrode layer of a second unit area 1034 in FIG. 1.

In the embodiment, the first sub-area 10151 is a polygonal ring-shaped, circular ring-shaped, or oval ring-shaped, the second sub-area 10152 is a polygonal shaped, circular shaped, or oval shaped; the third sub-area 10341 and the fourth sub-area 10342 are polygonal ring-shaped, circular ring-shaped, or oval ring-shaped, the fifth sub-area 10343 is polygonal shaped, circular shaped, or oval shaped. That is, the first common electrode 10131 and the second common electrode 1032 are both polygonal ring-shaped, circular ring-shaped, or oval ring-shaped.

In the present embodiment, since the first common electrode 10131 and the second common electrode 1032 are circular ring-shaped electrode, therefore the viewing angle of the display panel is able to be widened.

Figure 6:
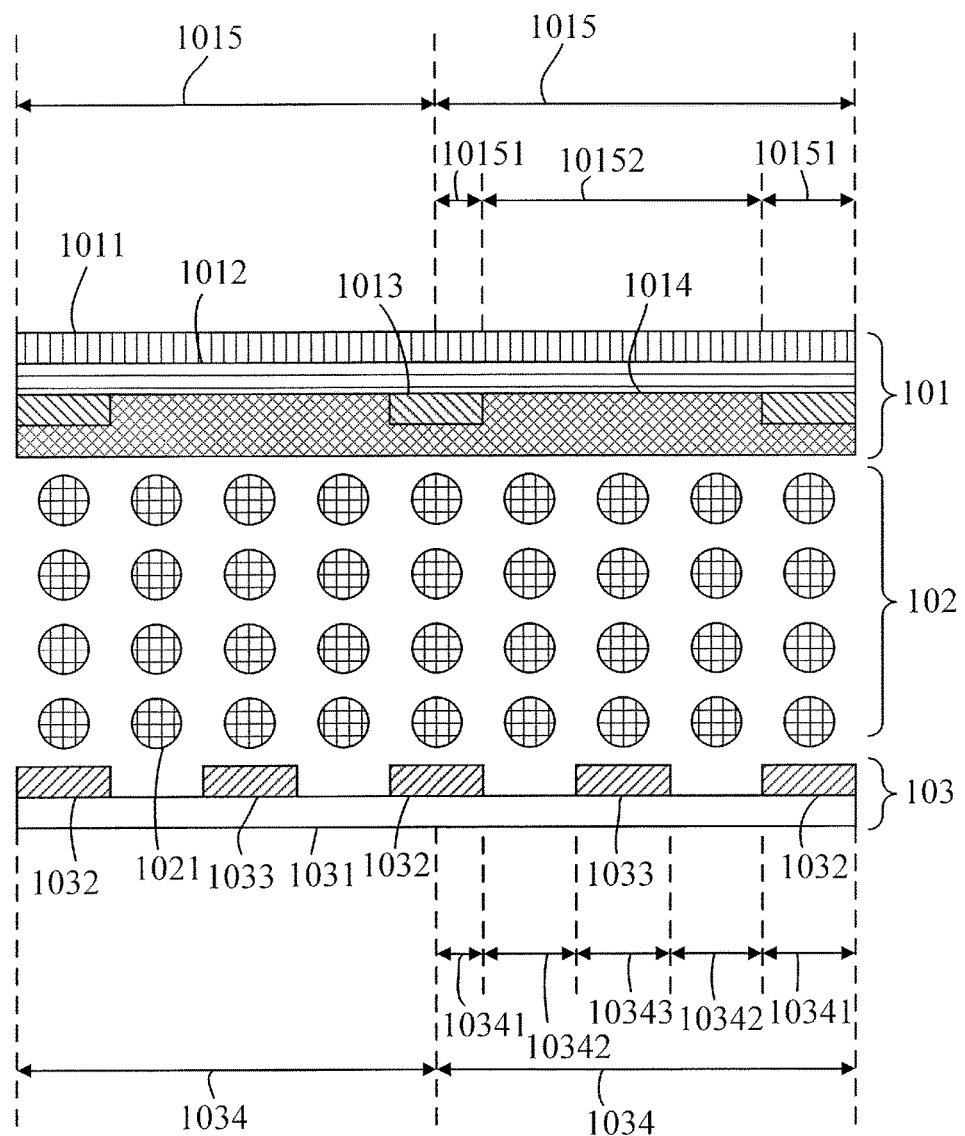
FIG. 6 is a schematic diagram of a display panel according to a second embodiment of the present invention.

Refer FIG. 6, which is a schematic diagram of a display panel according to a second embodiment of the present invention.

The embodiment is similar to the above-described first embodiment, except that: the first sub-area 10151 covers the entire third sub-area 10341, the second sub-area 10152 crosses the fourth sub-area 10342 and the fifth sub-area 10343, that is, the second sub-area 10152 covers the entire fourth sub-area 10342 and the entire fifth sub-area 10343.

Figure 7:
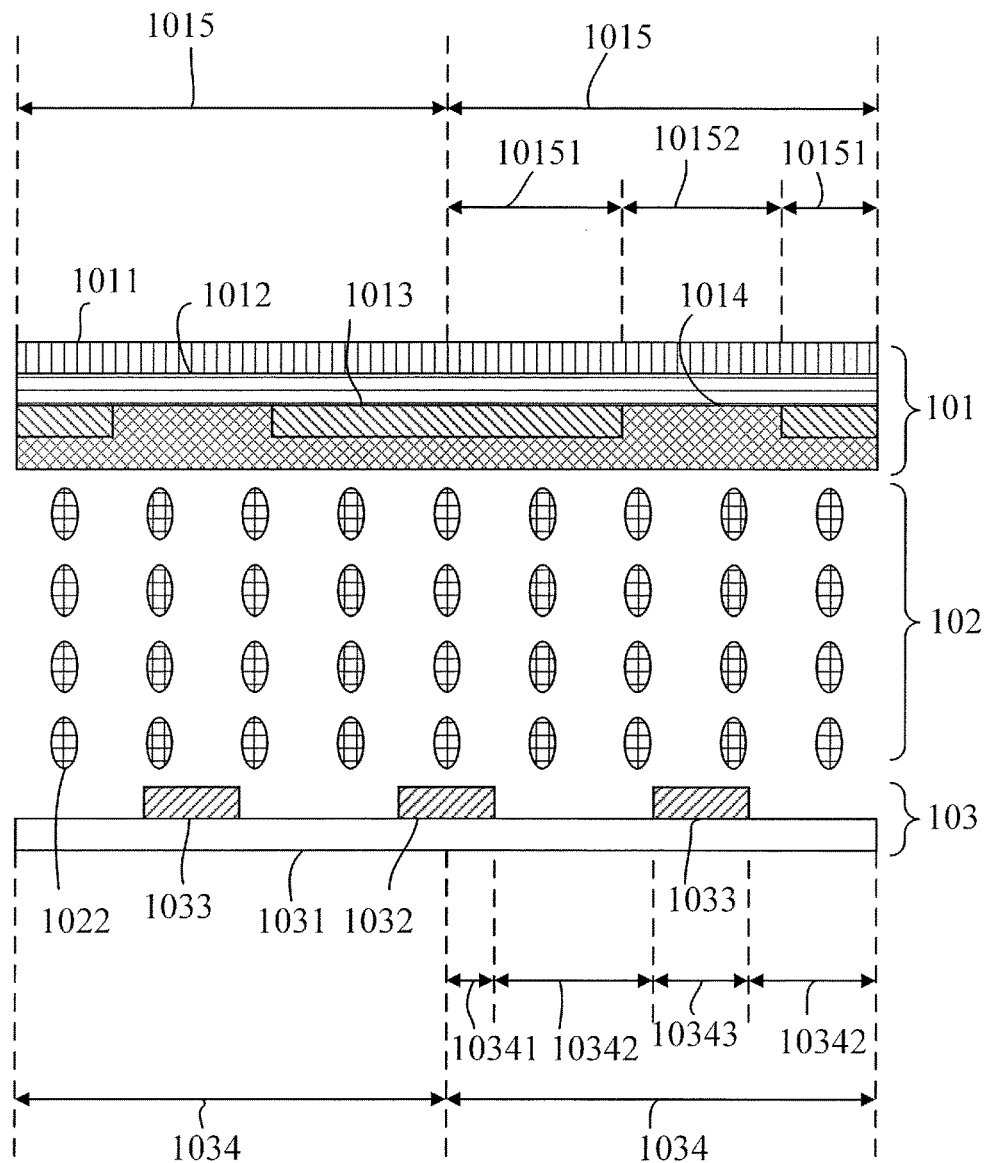
FIG. 7 is a schematic diagram of a display panel according to a third embodiment of the present invention.

Please refer to FIG. 7, which is a schematic diagram of a display panel according to a third embodiment of the present invention. The embodiment is similar to the above-described first embodiment and the second embodiment, except that: in the present embodiment, the liquid crystal layer 102 is a positive-type liquid crystal layer comprising positive-type liquid crystal molecules 1022.

The color filter substrate 101 and the thin film transistor array substrate 103 are respectively provided with a first polyimide layer and a second polyimide layer, the first polyimide layer and the second polyimide layer both are disposed in a vertical alignment state.

The above technical solution is advantageous in preventing the display panel from appearing a dark-state light leakage phenomenon, and improves the contrast of the display panel. A phase retardation will not be generated when the emergent light passes through the vertically oriented positive-type liquid crystal layer, and the polarization direction of the emergent light will not change.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such a feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising".

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present invention is defined by the appended claims rather than the foregoing description and the exemplary embodiments described therein.

What is claimed is:

1. A display panel, wherein the display panel comprises:
   a color filter substrate, the color filter substrate including
      a first substrate;
      a color filter layer, the color filter layer having at least two first unit areas arranged in a form of an array, the first unit area comprising a first sub-area and a second sub-area;
      a first common electrode layer, the first common electrode layer having at least two first common electrodes, the first common electrode being located in the first sub-area; and
      a dielectric layer;
   a liquid crystal layer, the liquid crystal layer is a blue-phase liquid crystal layer or a positive-type liquid crystal layer, wherein the blue-phase liquid crystal layer comprises blue-phase liquid crystal molecules, the positive-type liquid crystal layer comprises positive-type liquid crystal molecules; and
   a thin film transistor array substrate, the thin film transistor array substrate including:
      a second substrate, the second substrate having at least two second unit areas, the at least two second units being arranged in a form of an array, a position where the second unit area is located corresponding to a position where the first unit area is located, the second unit area comprising a third sub-area, a fourth sub-area and a fifth sub-area, the fourth sub-area being located between the third sub-area and the fifth sub-area;
      a second common electrode layer, the second common electrode having at least two common electrodes, the second common electrode being located in the third sub-area; and
      a pixel electrode layer, the pixel electrode layer having at least two pixel electrodes, the pixel electrode being located in the fifth sub-area, wherein the pixel electrode layer and the second common electrode layer are disposed on the same layer;
   wherein the color filter substrate and the thin film array substrate are stacked together in integral assembly, the liquid crystal layer is disposed between the color filter substrate and the thin film transistor array substrate;
   the first common electrode layer is disposed between the dielectric layer and the color filter layer;
   at least one part of the dielectric layer fills the second sub-area in the first common electrode layer;
   wherein a position of the third sub-area corresponds to a position of the first sub-area, a position of the fifth sub-area corresponds to a position of the second sub-area, and an area of the fifth sub-area is less than or equal to an area of the second sub-area;
   wherein the first sub-area covers the entire third sub-area and a first part of the fourth sub-area, the second sub-area covers the entire fifth sub-area and a second part of the fourth sub-area;
   wherein a projection of two adjacent first sub-areas on the first substrate is same as an area of a projection of the first common electrode on the first substrate; and
   wherein a projection of two adjacent third sub-areas on the second substrate is same as an area of a projection of the second common electrode on the second substrate.

2. The display panel as claimed in claim 1, wherein the first sub-area surrounds the second sub-area, the third sub-area surrounds the fourth sub-area, the fourth sub-area surrounds the fifth sub-area.

3. The display panel as claimed in claim 2, wherein the first sub-area is polygonal ring-shaped, circular ring-shaped, or oval ring-shaped, the second sub-area is polygonal shaped, circular shaped, or oval shaped; and
   the third sub-area and the fourth sub-area are polygonal ring-shaped, circular ring-shaped, or oval ring-shaped, the fifth sub-area is polygonal shaped, circular shaped, or oval shaped.

4. A display panel, wherein the display panel comprises:
a color filter substrate, the color filter substrate including:
  a first substrate;
  a color filter layer, the color filter layer having at least two first unit areas, the at least two first unit areas being arranged in a form of an array, the first unit area comprising a first sub-area and a second sub-area;
  a first common electrode layer, the first common electrode layer having at least two first common electrodes, the first common electrode being located in the first sub-area; and
  a dielectric layer;
a liquid crystal layer, the liquid crystal layer is a blue-phase liquid crystal layer or a positive-type liquid crystal layer, wherein the blue-phase liquid crystal layer comprises blue-phase liquid crystal molecules, the positive-type liquid crystal layer comprises positive-type liquid crystal molecules; and
a thin film transistor array substrate, the thin film transistor array substrate including:
  a second substrate, the second substrate having at least two second unit areas, the at least two second unit areas being arranged in a form of an array, a position where the second unit area is located corresponding to a position where the first unit area is located, the second unit area comprising a third sub-area, a fourth sub-area and a fifth sub-area, the fourth sub-area being located between the third sub-area and the fifth sub-area;
  a second common electrode layer, the second common electrode layer having at least two second common electrodes, the second common electrode being located in the third sub-area; and
  a pixel electrode layer, the pixel electrode layer having at least two pixel electrodes located in the fifth sub-area, wherein the pixel electrode layer and the second common electrode layer are disposed on the same layer;
wherein the color filter substrate and the thin film transistor array are stacked together in integral assembly, the liquid crystal layer is disposed between the color filter substrate and the thin film transistor array substrate;
wherein a position of the third sub-area corresponds to a position of the first sub-area, a position of the fifth sub-area corresponds to a position of the second sub-area, and an area of the fifth sub-area is less than or equal to an area of the second sub-area;
wherein the first sub-area covers the entire third sub-area and a first part of the fourth sub-area, the second sub-area covers the entire fifth sub-area and a second part of the fourth sub-area;
wherein a projection of two adjacent first sub-areas on the first substrate is same as an area of a projection of the first common electrode on the first substrate; and
wherein a projection of two adjacent third sub-areas on the second substrate is same as an area of a projection of the second common electrode on the second substrate.

5. The display panel as claimed in claim 4, wherein the first sub-area surrounds the second sub-area; the third sub-area surrounds the fourth sub-area, the fourth sub-area surrounds the fifth sub-area.

6. The display panel as claimed in claim 5, wherein the first sub-area is polygonal ring-shaped, circular ring-shaped, or oval ring-shaped, the second sub-area is polygonal shaped, circular shaped, or oval shaped; and
the third sub-area and the fourth sub-area are polygonal ring-shaped, circular ring-shaped, or oval ring-shaped, the fifth sub-area is polygonal shaped, circular shaped, or oval shaped.

7. The display panel as claimed in claim 4, wherein the first common electrode layer is disposed between the dielectric layer and the color filter layer; and
at least one part of the dielectric layer fills the second sub-area in the first common electrode.

8. The display panel as claimed in claim 4, wherein the first common electrode has a width in a range from 2 μm to 10 μm.

9. The display panel as claimed in claim 4, wherein the color filter substrate and the thin film transistor array substrate are respectively provided with a first polyimide layer and a second polyimide layer, the first polyimide layer and the second polyimide layer both are disposed in a vertical alignment state.

10. A display device, wherein the display device comprises:
a backlight module, and
a display panel, the display panel comprising:
  a color filter substrate, the color filter substrate including:
    a first substrate;
    a color filter layer, the color filter layer having at least two first unit areas, the at least two first unit areas being arranged in a form of an array, the first unit area comprising a first sub-area and a second sub-area;
    a first common electrode layer, the first common electrode layer having at least two first common electrodes located in the first sub-area; and
    a dielectric layer;
  a liquid crystal layer, the liquid crystal layer is a blue-phase liquid crystal layer or a positive-type liquid crystal layer, wherein the blue-phase liquid crystal layer comprises blue-phase liquid crystal molecules, the positive-type liquid crystal layer comprises positive-type liquid crystal molecules; and
  a thin film transistor array substrate, the thin film transistor array substrate including:
    a second substrate, the second substrate having at least two second unit areas, the at least two second units being arranged in a form of an array, a position where the second unit area is located corresponding to a position where the first unit area is located, the second unit area comprising a third sub-area, a fourth sub-area and a fifth sub-area, the fourth sub-area being located between the third sub-area and the fifth sub-area;
    a second common electrode layer, the second common electrode having at least two second common electrodes, the second common electrode being located in the third sub-area; and
    a pixel electrode layer, the pixel electrode having at least two pixel electrodes, the pixel electrode being located in the fifth sub-area, wherein the pixel electrode layer and the second common electrode layer are disposed on the same layer;
  wherein the color filter substrate and the thin film transistor array are stacked together in integral assembly, the liquid crystal layer is disposed between the color filter substrate and the thin film transistor array substrate;

wherein a position of the third sub-area corresponds to a position of the first sub-area, a position of the fifth sub-area corresponds to a position of the second sub-area, and an area of the fifth sub-area is less than or equal to an area of the second sub-area;

wherein the first sub-area covers the entire third sub-area and a first part of the fourth sub-area, the second sub-area covers the entire fifth sub-area and a second part of the fourth sub-area;

wherein a projection of two adjacent first sub-areas on the first substrate is same as an area of a projection of the first common electrode on the first substrate; and wherein a projection of two adjacent third sub-areas on the second substrate is same as an area of a projection of the second common electrode on the second substrate.

11. The display device as claimed in claim 10, wherein the first sub-area surrounds the second sub-area, the third sub-area surrounds the fourth sub-area, and the fourth sub-area surrounds the fifth sub-area.

12. The display device as claimed in claim 11, wherein the first sub-area is polygonal ring-shaped, circular ring-shaped, or oval ring-shaped, the second sub-area is polygonal shaped, circular shaped, or oval shaped; and the third sub-area and the fourth sub-area are polygonal ring-shaped, circular ring-shaped, or oval ring-shaped, the fifth sub-area is polygonal shaped, circular shaped, or oval shaped.

13. The display device as claimed in claim 10, wherein the first common electrode layer is disposed between the dielectric layer and the color filter layer; and at least one part of the dielectric layer fills the second sub-area in the first common electrode.

14. The display device as claimed in claim 10, wherein the first common electrode has a width in a range from 2 μm to 10 μm.

15. The display device as claimed in claim 10, wherein the color filter substrate and the thin film transistor array substrate are respectively provided with a first polyimide layer and a second polyimide layer, the first polyimide layer and the second polyimide layer both are disposed in a vertical alignment state.

* * * * *